United States Patent
Haenel

(10) Patent No.: US 11,572,029 B2
(45) Date of Patent: Feb. 7, 2023

(54) SIDE IMPACT AIRBAG FOR A MOTOR VEHICLE

(71) Applicant: Ford Global Technologies, LLC, Dearborn, MI (US)

(72) Inventor: Felix Haenel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/169,829

(22) Filed: Feb. 8, 2021

(65) Prior Publication Data
US 2021/0245700 A1 Aug. 12, 2021

(30) Foreign Application Priority Data
Feb. 9, 2020 (DE) .......................... 102020103242.0

(51) Int. Cl.
| B60R 21/231 | (2011.01) |
| B60R 21/21 | (2011.01) |
| B60R 21/207 | (2006.01) |
| B60R 21/00 | (2006.01) |
| B60R 21/235 | (2006.01) |

(52) U.S. Cl.
CPC ...... *B60R 21/23138* (2013.01); *B60R 21/207* (2013.01); *B60R 21/21* (2013.01); *B60R 2021/0006* (2013.01); *B60R 2021/0041* (2013.01); *B60R 2021/23146* (2013.01); *B60R 2021/23576* (2013.01)

(58) Field of Classification Search
None
See application file for complete search history.

(56) References Cited

U.S. PATENT DOCUMENTS

| 5,499,840 | A | * | 3/1996 | Nakano | B60N 2/68 |
| | | | | | 280/730.2 |
| 8,047,564 | B2 | * | 11/2011 | Kibat | B60R 21/23138 |
| | | | | | 280/730.2 |
| 8,388,019 | B2 | * | 3/2013 | Wipasuramonton | ........................ |
| | | | | | B60R 21/2342 |
| | | | | | 280/730.2 |
| 9,296,356 | B2 | | 3/2016 | Fujiwara | |

(Continued)

FOREIGN PATENT DOCUMENTS

| CN | 104802746 | A | * | 7/2015 | ....... B60R 21/23138 |
| CN | 109318851 | A | | 2/2019 | |

(Continued)

OTHER PUBLICATIONS

German Examination Report as issued by the German Patent Office dated Apr. 26, 2021.

*Primary Examiner* — Faye M Fleming
(74) *Attorney, Agent, or Firm* — Frank A. MacKenzie; Bejin Bieneman PLC

(57) ABSTRACT

A side impact cushion device of a motor vehicle contains at least one impact cushion which can be inflated by a gas generator. The impact cushion in an installation state has an upper portion, a central portion and a lower portion. In this case, the upper portion is arranged substantially horizontally in a deployed state, the central portion is formed in the form of a shell surface of a rotationally symmetrical, developable body, the lower portion can be supported on an upper side of an armrest and a rotational axis of the rotationally symmetrical body is oriented vertically in the deployed state.

20 Claims, 3 Drawing Sheets

(56) References Cited

U.S. PATENT DOCUMENTS

Figure 1:
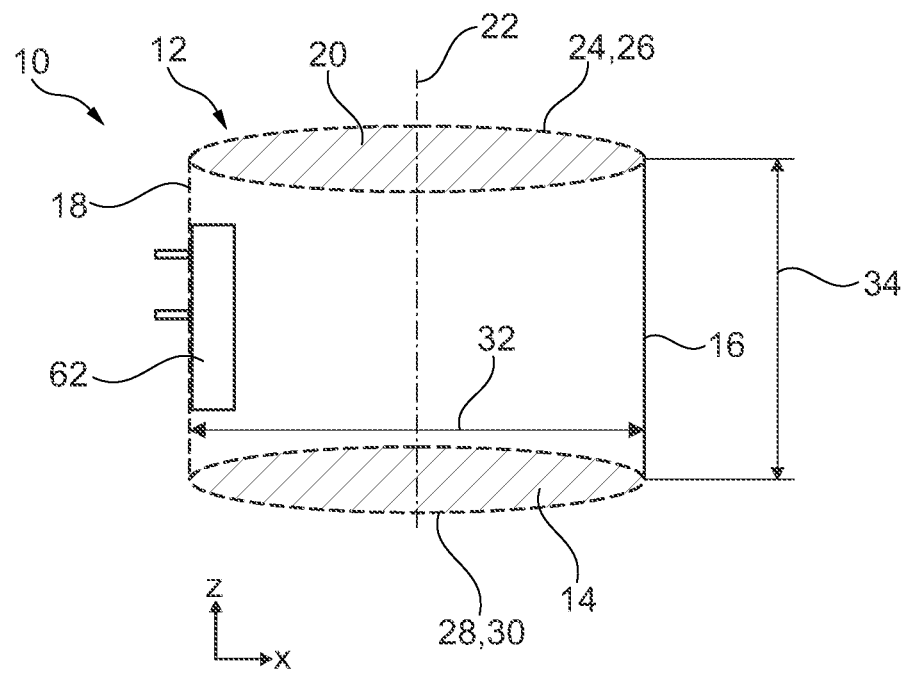

| | | | |
|---|---|---|---|
| 9,873,400 B2 | 1/2018 | Scherr et al. | |
| 2014/0346759 A1 | 11/2014 | Sadr et al. | |
| 2018/0265032 A1 | 9/2018 | Kobayashi et al. | |
| 2018/0290619 A1 | 10/2018 | Kitagawa | |

FOREIGN PATENT DOCUMENTS

| | | | |
|---|---|---|---|
| DE | 202005015840 U1 | | 1/2006 |
| JP | 6365188 B2 | | 7/2018 |
| JP | 2018135095 A | | 8/2018 |
| KR | 20160014634 A | * | 2/2016 |

* cited by examiner

SIDE IMPACT AIRBAG FOR A MOTOR VEHICLE

CROSS REFERENCE TO RELATED APPLICATIONS

This application claims priority to German Patent Application No. DE102020103242.0, filed Feb. 9, 2020, which is hereby incorporated herein by its reference in its entirety.

BACKGROUND

The disclosure relates to a side impact cushion device of a motor vehicle containing at least one impact cushion which can be inflated by a gas generator. The disclosure also relates to a motor vehicle component with such a side impact cushion device.

In the field of motor vehicle technology, the use of impact cushions which can be inflated suddenly by being filled with gas for the supplemental protection of vehicle occupants in certain impact conditions is known. Such supplemental restraints systems or airbags can be arranged both in a region in the straight ahead direction of travel in front of the vehicle occupants for protection in the case of a frontal impact event and in a lateral region (side impact airbag) transverse to the straight ahead direction of travel for protection in the case of a lateral impact event.

In the prior art, various solutions are known to raise an arm, which is facing the affected vehicle side, of a vehicle occupant in the case of a lateral impact event. These solutions can provide a time delay of an inflation process of different parts of a side impact cushion and/or an inflation of a side impact cushion in a direction from bottom to top.

For example, U.S. Pat. No. 9,296,356 B2 proposes a side impact cushion (side airbag) of a vehicle side impact cushion device in which a front impact cushion portion and a rear impact cushion portion are sub-divided by a longitudinal separating wall portion. Moreover, an impact cushion portion which extends forward and which is provided in an upper part of the rear impact cushion portion in order to hold up a shoulder is separated from the front impact cushion portion by an upper separating wall portion region which extends from an upper end of the elongated longitudinal separating wall portion diagonally upward to a front side of a backrest. If an inflation device is activated, the rear impact cushion portion is expanded and deployed at an early stage so that gas in the rear impact cushion portion is supplied via a connection opening which is provided in the longitudinal separating wall portion into the front impact cushion portion. As a result of this, it is possible to push up an upper arm and hold up rear parts of a chest, a stomach and a shoulder by means of the front impact cushion portion.

Moreover, a vehicle side impact cushion device is known from US 2018/0265032 A1 which contains a shoulder protection part and a rib cage protection part and is able to protect the rib cage by means of the rib cage protection part which gently raises an arm, as necessary depending on the collision status, without it being turned around to a great extent, while a shoulder is protected by the shoulder protection part. If a side impact cushion is provided on a seat and is spread out flat in an uninflated state, the contour of the side impact cushion has on the front side in the vehicle body forward-backward direction a turning point with a change in curvature in the center between the shoulder protection part and the rib cage protection part, furthermore an upper edge line which is directed upward from the turning point and a lower edge line which is directed downward from the turning point. The turning point is arranged in front of the shoulder protection part and above a center line which extends in the longitudinal direction of an upper arm of the occupant and divides the upper arm into an upper and a lower portion. The lower edge line crosses the center line from an upper side to a lower side and is positioned in a lower end position of the upper arm of the occupant below the center line.

The turning point separates between the upper edge line and the lower edge line so that the function of protection of the occupant by the shoulder protection part at the side of the upper edge line and the function of the protection of the occupant by the rib cage protection part at the side of the lower edge line do not impair one another. As a result of this, rib cage protection by raising the upper arm depending on the collision status and shoulder protection by the shoulder protection part can be achieved simultaneously.

CN 109318851 A furthermore describes a side impact cushion device which has a gas generator, a specially shaped impact cushion and a metal support. An air-conducting pocket is provided inside the specially shaped impact cushion for the introduction of gas. The air outlet of the gas generator is located inside the air-conducting pocket and faces the upper end of the air-conducting pocket. The upper end of the air-conducting pocket is formed as a closed structure, and the lower end of the air-conducting pocket is formed as an open structure. A lateral dimension of the contour of the impact cushion is greater than a vertical dimension of the contour. If a side impact event arises, the gas is conducted through the air-conducting pocket and a gas flow from top to bottom is formed in the lower end of the air-conducting pocket, and the gas is quickly blown from below to the inside of the specially shaped impact cushion. The air-conducting pocket and a special folding structure are used to raise the arm of the vehicle occupant. The side impact cushion device not only meets the requirements in terms of lateral collisions, but also those in terms of rear-impact collisions, and protect the occupants more comprehensively, while the extent of chest deformation is reduced.

JP 6365188 B2 furthermore discloses a side impact cushion device which contains an impact cushion which should be deployed between an occupant and a side door. The impact cushion contains a main chamber, a first sub-chamber and a second sub-chamber. The main chamber is supplied directly with gas by an inflation device in order to deploy in the lateral direction toward the torso of the occupant. The first sub-chamber is attached to the main chamber in such a manner that it, after deployment, is located on an upper side of an inside of the main chamber as seen in the width direction of the vehicle. The first sub-chamber is supplied with gas which is fed to the main chamber to deploy in one direction toward the side of the occupant. The second sub-chamber is attached at least to the first sub-chamber in such a manner that it, after deployment, is located above the main chamber and the first sub-chamber, and is supplied with gas which is fed to the first sub-chamber in order to deploy in the lateral direction toward the shoulder portion of the occupant.

U.S. Pat. No. 9,873,400 B2 furthermore proposes a method and a device for the protection of a vehicle occupant in the case of a lateral impact. The method for inflating a side impact cushion for protecting a vehicle occupant in the case of a side impact contains the steps:
equipping the side impact cushion with an inflatable thorax portion and an inflatable arm raising portion, wherein the arm raising portion is configured such that it extends laterally in front of the occupant from a lower end of the thorax portion; inflating the arm raining portion for raising an arm of the occupant and inflating the thorax portion after inflating the arm raising portion and raising the arm of the occupant.

The object on which the disclosure is based is to provide a side impact cushion device of a motor vehicle which has a particularly simple structure and simultaneously effectively and reliably enables a raising of an arm of a vehicle occupant in the event of a lateral impact event.

According to the disclosure, the object is achieved by a side impact cushion device. The object is furthermore achieved by a vehicle door with an armrest and such a side impact cushion device.

It should be pointed out that the features and measures listed individually in the following description can be combined with one another in any desired, technically expedient manner and highlight further configurations of the disclosure. The description characterizes and specifies the disclosure additionally in particular in conjunction with the figures.

The side impact cushion device according to the disclosure of a motor vehicle contains at least one impact cushion which can be inflated by a gas generator. Here, the impact cushion in an installation state has an upper portion, a central portion and a lower portion. The upper portion is arranged substantially horizontally in a deployed state, the central portion is formed substantially in the form of a shell surface of a rotationally symmetrical, developable body, and the lower portion can be supported on an upper side of an armrest, in particular an armrest of a motor vehicle door. A rotational axis of the rotationally symmetrical, developable body is oriented substantially vertically in the deployed state.

The proposed side impact cushion device has a particularly simple structure. An effective and reliable raising of an arm of a vehicle occupant in the event of a lateral impact event can be achieved with the substantially horizontally arranged, upper portion. The lower portion which can be supported on an upper side of an armrest can provide a secure retention of the impact cushion from which a defined and reproducible upward movement of the upper portion can be enabled so that the arm of the vehicle occupant comes into mechanical bearing with a high level of reliability with the upper portion during its upward movement and can be raised by the impact cushion. This is in particular successful due to the fact that a slipping of the impact cushion into a lower sub-chamber between the vehicle occupant and a side region of the motor vehicle can be effectively prevented.

The term "motor vehicle" should be understood within the meaning of the disclosure in particular as a car, a heavy goods vehicle, a semitrailer or a bus. The term "arranged substantially horizontally" should within the meaning of the disclosure also include in particular arrangements which have a deviation from a horizontal direction of at most 20°, preferably at most 15° and, particularly preferably, at most 10°. The term "oriented substantially vertically" should within the meaning of the disclosure include in particular orientations which have a deviation from a vertical direction of at most 20°, preferably at most 15° and, particularly preferably, at most 10°.

The impact cushion is preferably in a manner known per se equipped with a ventilation opening which enables an adjustment of the rigidity of the impact cushion by a controlled air flow which escapes from the impact cushion.

In embodiments of the side impact cushion device, the upper portion and the central portion have at least one joint first edge and the central portion and the lower portion have at least one joint second edge. In this manner, an impact cushion of the side impact cushion device according to the disclosure with a particularly simple construction can be provided. The terms "first", "second", etc. used in this application only serve the purpose of differentiation. In particular, no sequence or priority of the objects named in conjunction with these terms should be implied by their use.

At least the joint first edge or at least the joint second edge preferably has a sewn seam. As a result of this, an impact cushion of the side impact cushion device according to the disclosure can be produced with particular ease.

In embodiments of the side impact cushion device, the central portion has a sewn seam which is oriented substantially perpendicular to the joint first edge. In this manner, the central portion of the impact cushion can be provided in a particularly simple manner.

The rotationally symmetrical body is formed substantially in the form of a straight elliptical cylinder, wherein the upper portion forms a covering surface, the central portion forms the shell surface and the lower portion forms a base surface of the cylinder form and the rotational axis is formed by a central axis of the cylinder form.

The term a "straight elliptical cylinder form" should be understood within the meaning of the disclosure in particular as the form of a cylinder, the straight central axis of which is arranged perpendicular to its base surface, wherein the base surface is formed to be elliptical and can be formed in particular to be circular. In particular, cylinder forms should also be included, the straight central axis of which forms an angle of up to 20° with a direction arranged perpendicular to the base surface.

The term "substantially in the form of a straight elliptical cylinders" should be understood within the meaning of this disclosure in particular such that a deviation of a magnitude of a volume of the impact cushion from a magnitude of a minimal straight elliptical cylinder enclosing the impact cushion is less than 30%, preferably less than 20%, and, particularly preferably, less than 15%.

If the impact cushion is formed in the form of a straight elliptical cylinder, a particularly expediently large horizontal bearing surface for raising an arm of a vehicle occupant in the case of a lateral impact event can be provided by the upper portion. Moreover, a particularly expediently large, horizontal supporting surface for secure support of the impact cushion on an upper side of an armrest can be provided by the lower portion, which enables a defined and reproducible upward movement of the upper portion.

In embodiments of the side impact cushion device, the rotationally symmetrical body is formed substantially in the form of a straight truncated cone. In this case, the upper portion forms a covering surface, the central portion forms a shell surface and the lower portion forms a base surface of the straight truncated cone. The rotational axis is formed by a central axis of the straight truncated cone. The size of a covering surface of the truncated cone is at least 70% of the size of a base surface of the truncated cone. As a result of this, greater flexibility can be achieved in the design of the impact cushion, in the case of which a particularly expediently large horizontal bearing surface for raising an arm of a vehicle occupant and an expediently large horizontal supporting surface for secure retention of the impact cushion can be achieved.

The term "substantially in the form of a straight truncated cone" should be understand within the meaning of this disclosure in particular such that a deviation of a magnitude of a volume of the impact cushion from a magnitude of a minimal straight truncated cone enclosing the impact cushion is less than 30%, preferably less than 20%, and, particularly preferably, less than 15%.

The form of the straight truncated cone has a base surface which is formed to be elliptical and can be formed in particular to be circular. In particular, such truncated cone forms should also be included, the straight central axis of which forms an angle of up to 20° with a direction arranged perpendicular to the base surface.

In the deployed state of the impact cushion a maximum horizontal dimension of the impact cushion is larger than a maximum vertical dimension of the impact cushion. As a result of this, particularly secure support and reliable upward movement of the upper portion can be achieved, in the case of which an arm of a vehicle occupant can come into mechanical bearing with the upper portion with a high degree of reliability and be raised by the impact cushion.

In embodiments of the side impact cushion device, in the deployed state at least one lateral dimension of the impact cushion, measured transverse to a straight ahead direction of travel of the motor vehicle, is adapted to a distance between a side region of the motor vehicle and a vehicle occupant in a predetermined seat position. As a result of this, in the event of a lateral impact event, in addition to the function of raising an arm of a vehicle occupant, for his or her further protection, a space between the vehicle occupant and a vehicle door affected by the lateral impact event can be filled out.

In embodiments of the side impact cushion device, in the deployed state at least one vertical dimension of the impact cushion is adapted to a predetermined distance between an upper side of an armrest of the motor vehicle and an armpit region of a vehicle occupant in a predetermined seat position. As a result of this, in the event of a lateral impact event, a raising of an arm of a vehicle occupant which is sufficient to increase safety can be achieved by the impact cushion, wherein an excessive loading or rotation of the corresponding shoulder joint of the vehicle occupant can be avoided.

In a further aspect of the present disclosure, a motor vehicle component is provided which is formed as a motor vehicle door with an armrest or as a vehicle seat with a backrest. The motor vehicle component is equipped with one embodiment of the side impact cushion device according to the disclosure which is received in the motor vehicle component in a deployed state. In the deployed state the lower portion of the impact cushion can be supported on an upper side of the armrest. The motor vehicle component furthermore contains at least one gas generator which is arranged within the impact cushion.

The advantages described in conjunction with the side impact cushion device also fully apply to the proposed motor vehicle component.

Figure 2:
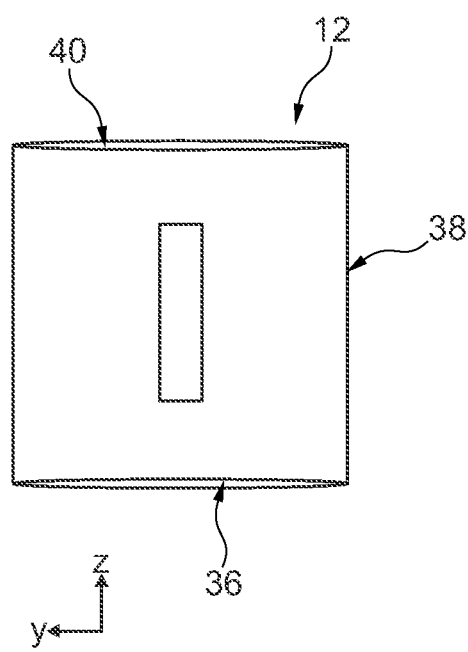
Figure 3:
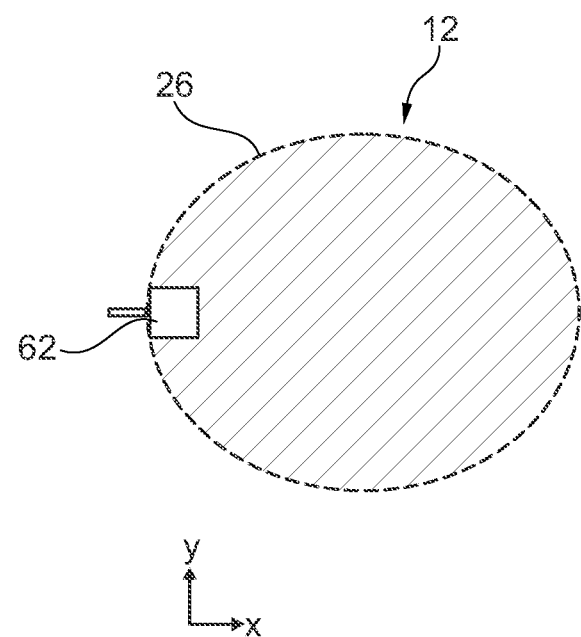
Figure 4:
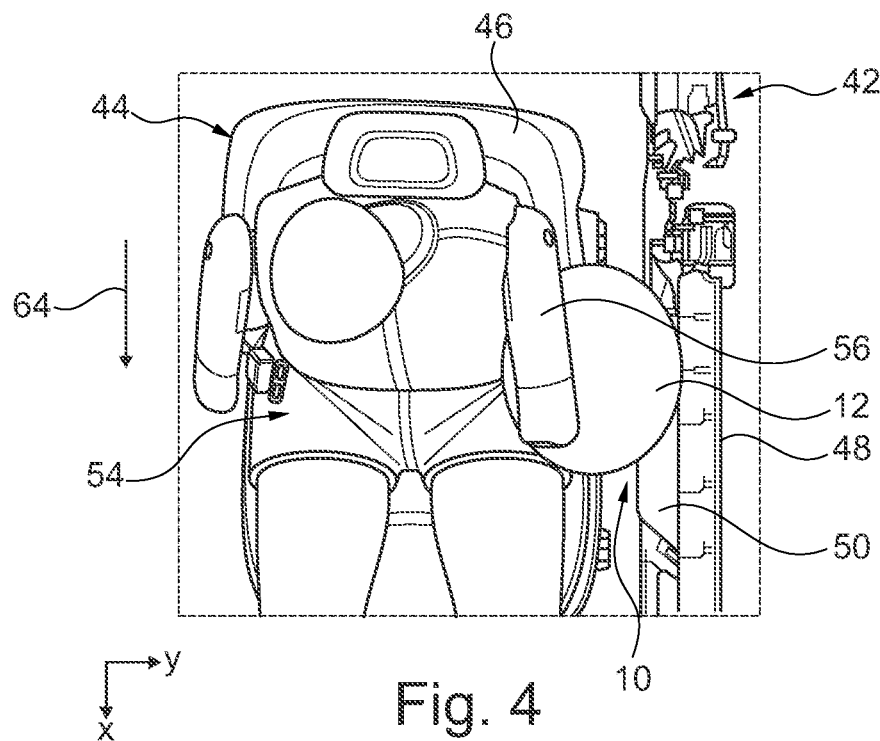
Figure 5:
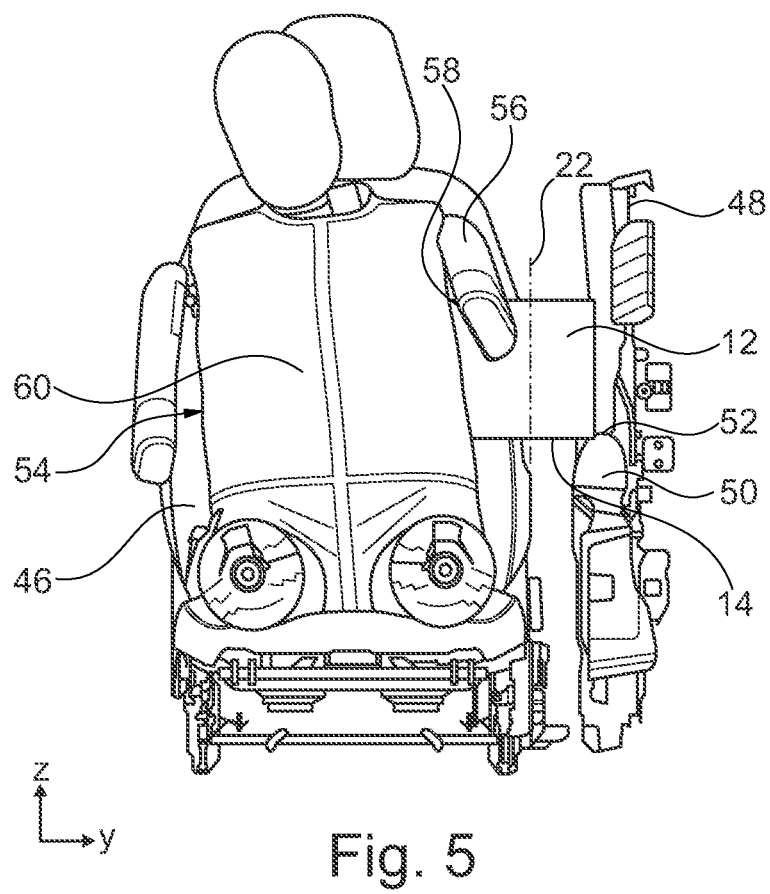
Figure 6:
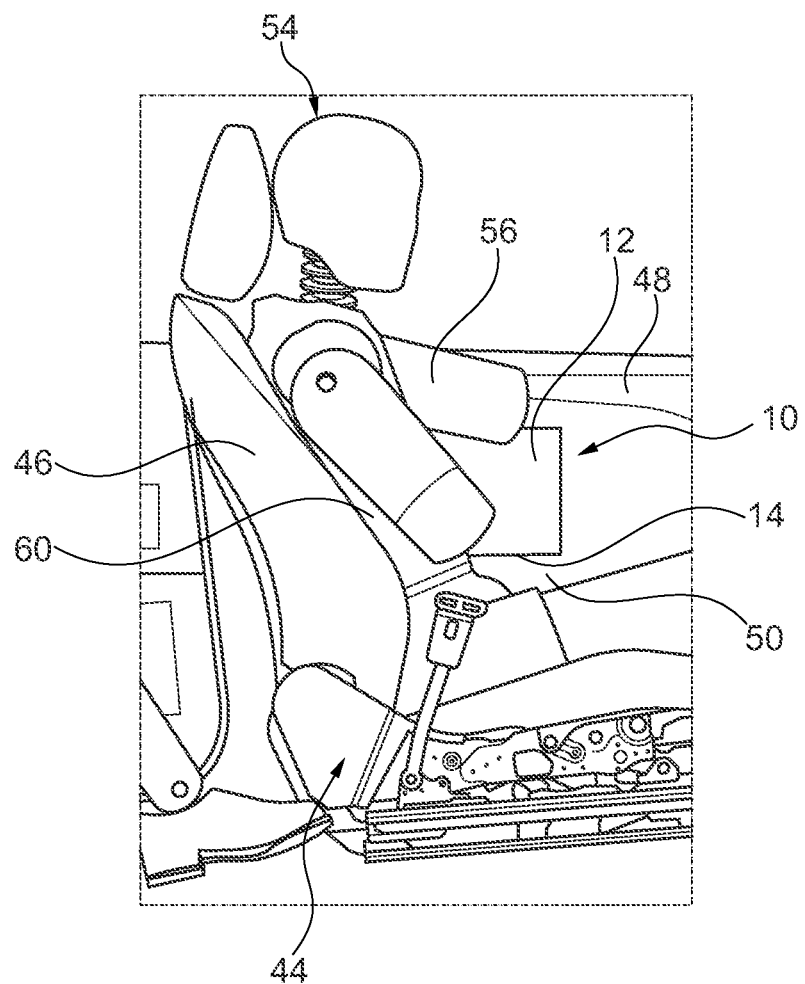

Further advantageous configurations of the disclosure are disclosed in the subordinate claims and the following description of the figures. In the figures FIG. 1 shows a schematic representation of a side impact cushion device according to the disclosure in a deployed state in a side view, FIG. 2 shows a schematic representation of the side impact cushion device according to FIG. 1 in the deployed state in a rear view, FIG. 3 shows a schematic representation of the side impact cushion device according to FIG. 1 in the deployed state in a plan view, FIG. 4 shows a schematic representation of the side impact cushion device installed in a motor vehicle according to FIGS. 1 to 3 in the deployed state in a plan view, FIG. 5 shows a schematic representation of the side impact cushion device installed in the motor vehicle according to FIG. 4 in a front view, and FIG. 6 shows a schematic representation of the side impact cushion device installed in the motor vehicle according to FIG. 4 in a side view.

Identical parts are always provided with the same reference numbers in the various figures, which is why these are generally also only described once.

FIG. 1 shows a schematic representation of a possible embodiment of a side impact cushion device 10 according to the disclosure of a motor vehicle in a deployed state in a side view. FIGS. 2 and 3 show a schematic representation of side impact cushion device 10 according to FIG. 1 in the deployed state in a rear view (FIG. 2) or plan view (FIG. 3).

Side impact cushion device 10 contains an impact cushion 12 which can be inflated by means of a gas generator 62. Impact cushion 12 has, in an installation state, a lower portion 14, a central portion 16 and an upper portion 20. Impact cushion 12 can be produced from a plastic material, for example, from polyamide or another thermoplastic plastic.

In the deployed state, upper portion 20 is arranged horizontally. Central portion 16 is formed in the form of a shell surface of a rotationally symmetrical, developable body. In the represented embodiment, the rotationally symmetrical, developable body is formed in the form of a straight elliptic cylinder. Lower portion 14 forms a base surface 36, central portion 16 forms shell surface 38 and upper portion 20 forms a covering surface 40 of the cylinder form (FIG. 2). The axis of rotation is formed by a central axis 22 of the cylinder form.

Gas generator 62 is arranged in an interior of impact cushion 12 on central portion 16. Gas generator 62 can be a component part of side impact cushion device 10 or a different vehicle component.

Central portion 16 and upper portion 20 form a joint first edge 24 (FIG. 1) which runs along a circumferential line of elliptical covering surface 40 and has a sewn seam 26. Central portion 16 and lower portion 14 form a joint second edge 28 which runs along a circumferential line of elliptical base surface 36 and also has a sewn seam 30.

Central portion 16 furthermore has a sewn seam 18 which is oriented perpendicular to joint first edge 24. Central portion 16 can be produced from a rectangular fabric part composed of a plastic fiber, for example, from polyamide or another thermoplastic plastic.

As is apparent from FIGS. 1 to 3 in the represented, deployed state of impact cushion 12, a maximum horizontal dimension 32 of impact cushion 12, namely in the x-direction, is greater than a maximum vertical dimension 34 of impact cushion 12 in the z-direction.

In another embodiment, not represented, the rotationally symmetrical, developable body, as the shell surface of which the central portion of the impact cushion is formed, can also be formed in the form of a straight truncated cone. In this case, the upper portion forms a covering surface, the central portion forms a shell surface and the lower portion forms a base surface of the straight truncated cone. The axis of rotation is formed by a central axis of the straight truncated cone, and the size of a covering surface of the truncated cone is at least 70% of the size of a base surface of the truncated cone.

FIG. 4 shows a schematic representation of side impact cushion device 10 installed in a motor vehicle 42 formed as a car according to FIGS. 1 to 3 in the deployed state in a plan view. A vehicle occupant 54 formed by the driver of motor vehicle 42 occupies vehicle seat 44 in a normal seat position. FIG. 4 shows a driving situation immediately after the occurrence of a lateral impact event, as a result of which a control device, not represented, of motor vehicle 42 has triggered a deployment of side impact cushion 12 by gas generator 62 (FIG. 1).

The motor vehicle component is equipped with side impact cushion device 10 according to FIGS. 1 to 3. The motor vehicle component can be formed as motor vehicle door 48 with an armrest 50, as a B-column or, as represented in FIG. 4, as vehicle seat 44 with a backrest 46. Side impact cushion device 10 is, in an undeployed state, installed and received in back rest 46. As is generally commonplace, a position of side impact cushion device 10 in the undeployed state can only be seen by means of an embossed marking in a cover.

As is apparent from FIG. 4, in the represented, deployed state, a lateral dimension of the impact cushion, measured transverse to a straight ahead direction of travel 64 of the motor vehicle, i.e. parallel to the y-direction, is adjusted to a distance between a side region, formed by motor vehicle door 48, of motor vehicle 42 and vehicle occupant 54 in a predetermined seat position so that impact cushion 12 entirely fills this distance in the y-direction.

FIG. 5 shows a schematic representation of side impact cushion device 10 installed in motor vehicle 42 according to FIG. 4 in a front view.

As is apparent from FIG. 5, in the represented, deployed state, a vertical dimension of impact cushion 12, i.e. a dimension parallel to the z-direction, is adjusted to a predetermined distance between an upper side 52 of armrest 50 of vehicle door 48 and an armpit region 58 of vehicle occupant 54 in the predetermined seat position so that impact cushion 12 completely fills this distance in the z-direction. The vertical dimension of impact cushion 12 can correspond, for example, to the 95% percentile of an empirically determined distance between an armpit region of a vehicle occupant and a seat surface in a normal seat position.

Side impact cushion device 10 is installed in backrest 46 of vehicle seat 44 (driver's seat) in such a manner that, in the represented, deployed state, lower portion 14 of impact cushion 12 is supported on upper side 52 of armrest 50 (FIG. 5). The axis of rotation formed by central axis 22 of the cylinder form is oriented vertically.

A defined and reliably reproducible upward movement of upper portion 20 is performed from the supported position of lower portion 14 of impact cushion 12, as a result of which upper portion 20 comes into mechanical bearing with arm 56 of vehicle occupant 54 so that arm 56 is raised in such a manner that, as seen in the lateral direction, there is no overlap with a rib cage 60 of vehicle occupant 54 (FIG. 6).

LIST OF REFERENCE NUMBERS

10 Side impact cushion device
12 Impact cushion
14 Lower portion
16 Central portion
18 Sewn seam
20 Upper portion
22 Central axis
24 First edge
26 Sewn seam
28 Second edge
30 Sewn seam
32 Maximum horizontal dimension
34 Maximum vertical dimension
38 Base surface
40 Shell surface
42 Covering surface
44 Motor vehicle
46 Vehicle seat
48 Backrest
50 Motor vehicle door
52 Armrest
54 Upper side
56 Vehicle occupant
58 Arm
60 Armpit region
60 Rib cage
62 Gas generator
64 Straight ahead direction of travel

The invention claimed is:

1. A side impact cushion device, comprising:
a gas generator; and
at least one impact cushion that is inflatable by the gas generator from an installation state to a deployed state;
the impact cushion in the installation state having an upper portion, a central portion and a lower portion;
in the deployed state, the upper portion is arranged substantially horizontally, the central portion is hollow and rotationally symmetrical, and the lower portion is designed to be supported on an upper side of an armrest; and
in the deployed position a rotational axis of the central portion is oriented substantially vertically;
wherein, in the deployed state, a maximum horizontal dimension of the impact cushion is larger than a maximum vertical dimension of the impact cushion.

2. The side impact cushion device as set forth in claim 1, wherein the upper portion and the central portion have at least one joint first edge and the central portion and the lower portion have at least one joint second edge.

3. The side impact cushion device as set forth in claim 2, wherein the joint first edge has a sewn seam and/or the joint second edge has a sewn seam.

4. The side impact cushion device as set forth in claim 2, wherein the central portion has a sewn seam which is oriented substantially perpendicular to the joint first edge.

5. The side impact cushion device as set forth in claim 1, wherein the central portion has the shape of a straight elliptical cylinder, the upper portion forms one base of the cylinder and the lower portion forms another base of the cylinder.

6. The side impact cushion device as set forth in claim 1, wherein the central portion has the shape of a straight truncated cone, the upper portion forms a smaller base of the straight truncated cone, and the lower portion forms a larger base of the straight truncated cone.

7. The side impact cushion deice as set forth in claim 6, wherein the size of the smaller base of the truncated cone is at least 70% of the size of the larger base of the truncated cone.

8. The side impact cushion device as set forth in claim 1, wherein, in the deployed state, a maximum horizontal dimension of the impact cushion is larger than a maximum vertical dimension of the impact cushion.

9. The side impact cushion device as set forth in claim 1, wherein, in the deployed state, at least one lateral dimension of the impact cushion, measured transverse to a straight ahead direction of travel of the motor vehicle, is adapted to a distance between a side region of the motor vehicle and a vehicle occupant in a predetermined seat position.

10. The side impact cushion device as set forth in claim 1, wherein, in the deployed state, at least one vertical dimension of the impact cushion is adapted to a predetermined distance between an upper side of an armrest of the motor vehicle and an armpit region of a vehicle occupant in a predetermined seat position.

11. A motor vehicle component including the side impact cushion device of claim 1, further comprising:
   an armrest; and
   the gas generator being supported by the armrest.

12. A side impact cushion device, comprising:
   a gas generator; and
   at least one impact cushion that is inflatable by the gas generator from an installation state to a deployed state;
   the impact cushion in the installation state having an upper portion, a central portion and a lower portion;
   in the deployed state, the upper portion is arranged substantially horizontally, the central portion is hollow and rotationally symmetrical, and the lower portion is designed to be supported on an upper side of an armrest; and
   in the deployed position a rotational axis of the central portion is oriented substantially vertically;
   wherein the central portion has the shape of a straight elliptical cylinder, the upper portion forms one base of the cylinder and the lower portion forms another base of the cylinder.

13. The side impact cushion device as set forth in claim 12, wherein the upper portion and the central portion have at least one joint first edge and the central portion and the lower portion have at least one joint second edge.

14. The side impact cushion device as set forth in claim 13, wherein the joint first edge has a sewn seam and/or the joint second edge has a sewn seam.

15. The side impact cushion device as set forth in claim 13, wherein the central portion has a sewn seam which is oriented substantially perpendicular to the joint first edge.

16. The side impact cushion device as set forth in claim 12, wherein, in the deployed state, a maximum horizontal dimension of the impact cushion is larger than a maximum vertical dimension of the impact cushion.

17. The side impact cushion device as set forth in claim 12, wherein, in the deployed state, at least one lateral dimension of the impact cushion, measured transverse to a straight ahead direction of travel of the motor vehicle, is adapted to a distance between a side region of the motor vehicle and a vehicle occupant in a predetermined seat position.

18. The side impact cushion device as set forth in claim 12, wherein, in the deployed state, at least one vertical dimension of the impact cushion is adapted to a predetermined distance between an upper side of an armrest of the motor vehicle and an armpit region of a vehicle occupant in a predetermined seat position.

19. A side impact cushion device, comprising:
   a gas generator; and
   at least one impact cushion that is inflatable by the gas generator from an installation state to a deployed state;
   the impact cushion in the installation state having an upper portion, a central portion and a lower portion;
   in the deployed state, the upper portion is arranged substantially horizontally, the central portion is hollow and rotationally symmetrical, and the lower portion is designed to be supported on an upper side of an armrest; and
   in the deployed position a rotational axis of the central portion is oriented substantially vertically;
   wherein the central portion has the shape of a straight truncated cone, the upper portion forms a smaller base of the straight truncated cone, and the lower portion forms a larger base of the straight truncated cone.

20. The side impact cushion deice as set forth in claim 19, wherein the size of the smaller base of the truncated cone is at least 70% of the size of the larger base of the truncated cone.

\* \* \* \* \*